May 12, 1964 P. G. LA VIGNE ETAL 3,132,579
CEILING DUCT STRUCTURE
Filed Sept. 27, 1960 2 Sheets-Sheet 1
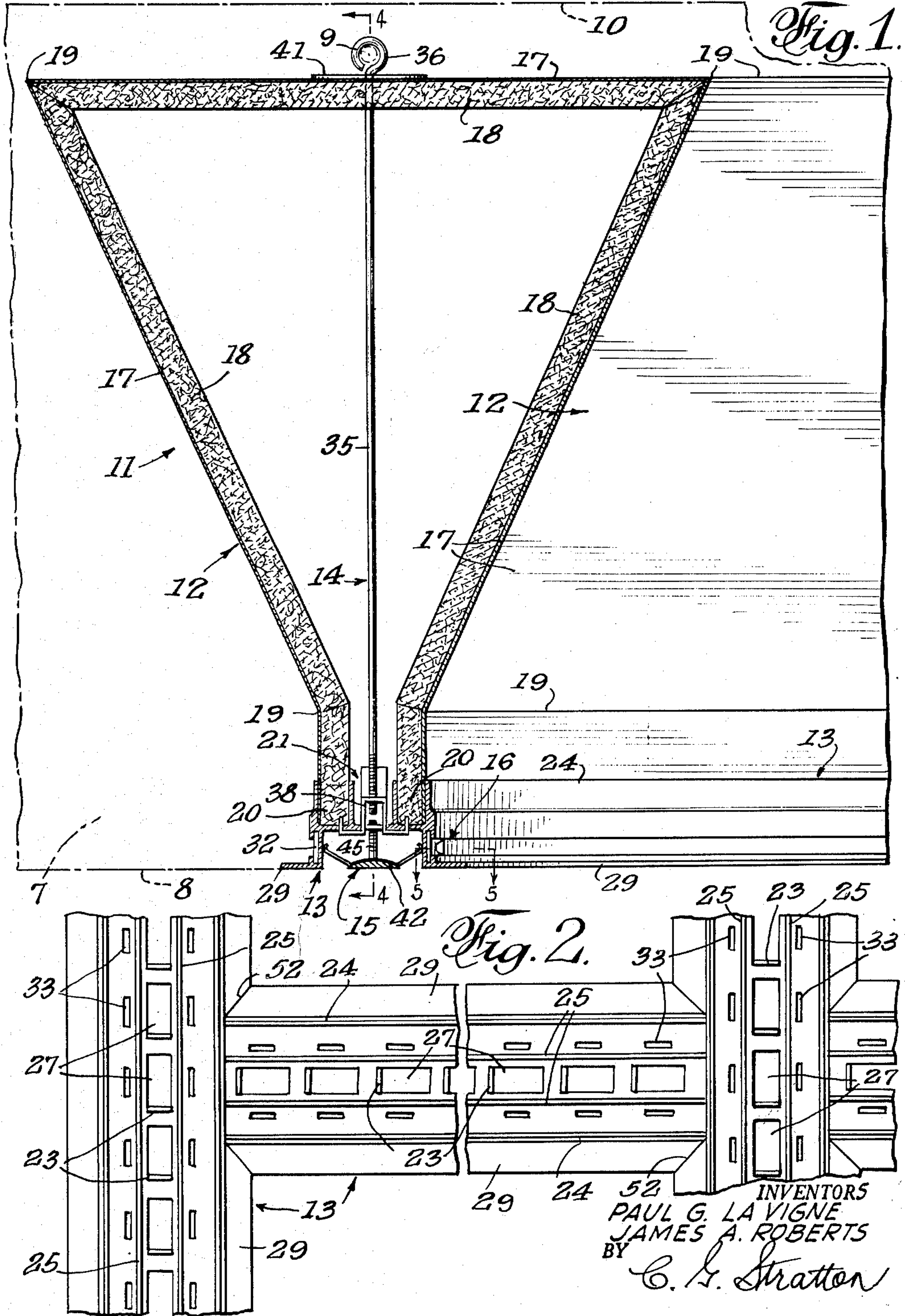

CEILING DUCT STRUCTURE
Filed Sept. 27, 1960 2 Sheets-Sheet 2
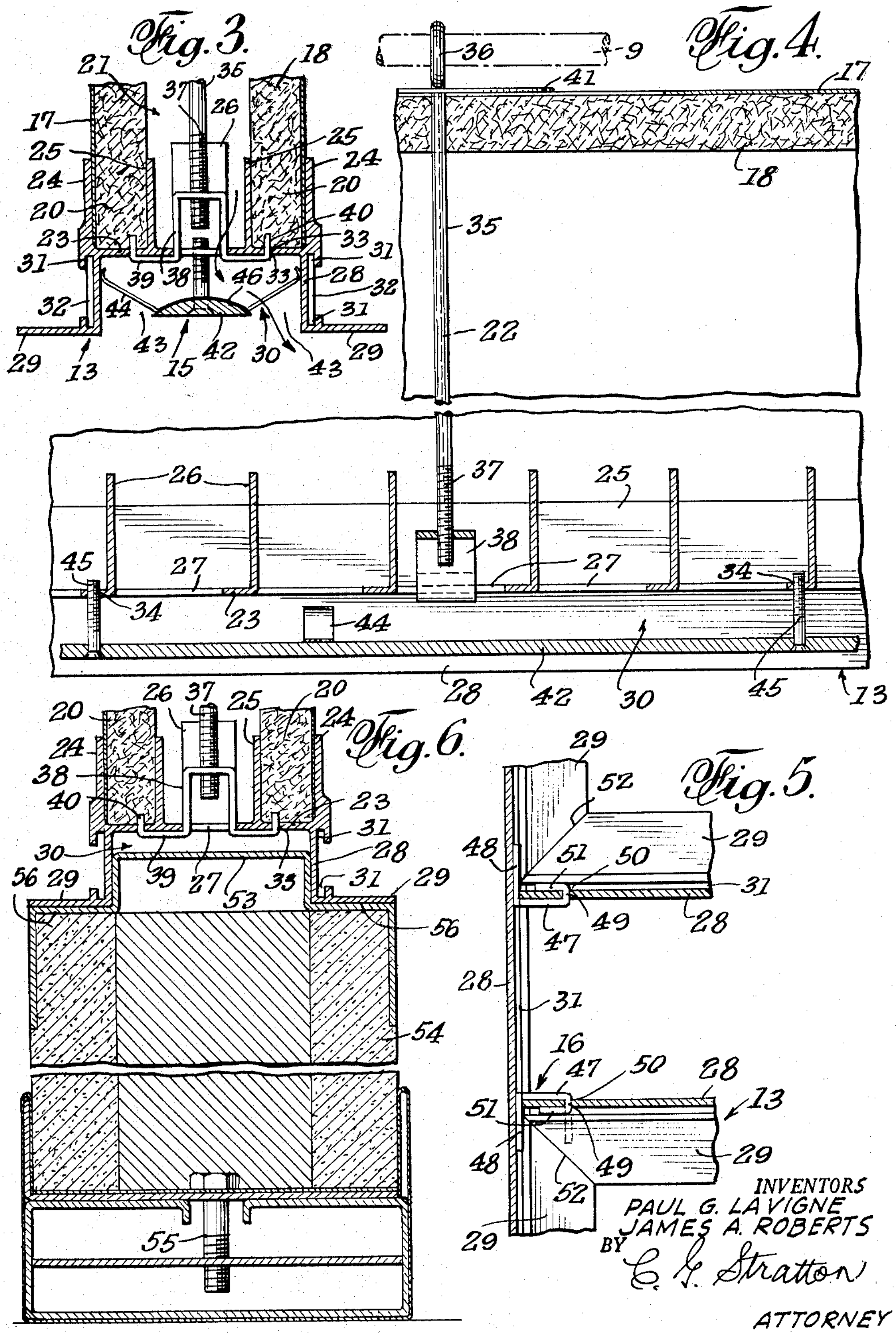
INVENTORS
PAUL G. LA VIGNE
JAMES A. ROBERTS
BY C. G. Stratton
ATTORNEY United States Patent Office 3,132,579

Patented May 12, 1964

1

3,132,579

CEILING DUCT STRUCTURE

Paul G. La Vigne, La Habra, and James A. Roberts, Whittier, Calif., assignors, by mesne assignments, to Sunbeam Lighting Co., Inc., Los Angeles, Calif., a corporation of California Filed Sept. 27, 1960, Ser. No. 58,799

7 Claims. (Cl. 98—40)

This invention relates to a ceiling duct structure and has for an object to provide simple and improved means adapted to be installed in a ceiling in modular spacing and adapted for use as a cold or warm air duct for heating, cooling or ventilating purposes or as partition-centering means, as desired.

Another object of the invention is to provide a duct structure that is readily converted from one purpose, as above, to the other, thereby providing for flexibility of purpose and of interchange at minimum expense and with little or no requirement for repainting or other patching work such as ordinarily attends installation changes in prior duct structures.

A further object of the invention is to provide a duct structure, as above contemplated, that presents a small, unobtrusive and flush lower end portion that so combines with surrounding ceiling panels as to provide a pleasing effect as well as one that is efficient for the purposes intended.

A still further object of the invention is to provide, in a duct structure, as above indicated, a novel air-distributing channel capable of easy and effective adjustment to obtain air flow as desired.

A yet further object of the invention is to provide novel suspension or support means for a ceiling duct structure of the character referred to.

A further object of the invention is to provide a duct structure including novel and improved means for connecting ducts in transverse or intersecting relationship.

This invention also has for its objects to provide such means that are positive in operation, convenient in use, easily installed in a working position and easily disconnected therefrom, economical of manufacture, a relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

In the drawings, like reference characters designate similar parts in the several views.

FIG. 1 is a vertical sectional view of a ceiling duct structure according to the present invention and arranged to serve as an air-distributing device.

FIG. 2 is a broken plan view of a lower end framing member, used in the present structure and shown in modular spacing with connecting transverse framing members.

FIG. 3 is an enlarged vertical sectional view of the lower portion of the duct structure and showing another adjusted position of the air-distributing means of the device.

2

FIG. 4 is a broken vertical sectional view as taken on the line 4—4 of FIG. 1, showing the duct structure with the adjustment of FIG. 3.

FIG. 5 is an enlarged horizontal and fragmentary sectional view showing details of connection between intersecting duct structures.

FIG. 6 is a vertical sectional view, similar to FIG. 3, showing the duct arranged to hold and align a partition.

The drawing suggests, at 7, a floor slab of any of the usual construction or fabrication, the same having a ceiling face 8. Regardless how otherwise fabricated, said floor slab is provided with rods 9 below the floor surface 10, said rods being representative of suitable hanger members that, in the present instance, are used to suspend the duct structures 11 that comprise the subject matter of this invention.

Following accepted architectural practice, the duct structures that are illustrated are preferably arranged on predetermined modular spacing, as suggested in FIG. 2, and all or some of said ducts may be connected by similar ducts. Thus, the present duct structures are adapted for a wide variety of installations to conduct air from a single source, or from several sources, or to vent air from the area beneath the ceiling surface 8, as desired.

The present duct structure 11 comprises, generally a duct 12, a lower channel member 13 that constitutes a bottom enclosure for the duct 12, means 14 to support the channel member 13 from the hanger rods 9 and to thereby support the ducts in position with the floor slab, means 15 to adjustably control air flow from the duct through the lower channel member 13, and means 16 for connecting the end of a transverse member 13 to a longitudinal member 13 that is on the modulator spacing above referred to.

While the duct 12 is shown as of triangular cross-section, the shape may vary, as desired. The shape that is shown lends itself well to interfit with gaseous tube lighting fixtures, especially those that have outwardly sloped side walls such as would fit nicely against the sloping side walls of the present duct. In any case, the duct 12 is formed of a sheet metal outer wall 17 that is lined with a suitable thickness of fiber glass 18. In practice, the duct wall 17 may be provided at the point of installation as a flat sheet of aluminum with suitable longitudinal score lines 19 so that the same may be bent along said score lines, on the job, to the duct shape contemplated. The fiber glass liner may be first cemented to the wall sheet 17, then the bending may be effected, to leave the ends 20 of the duct walls spaced apart, as can be seen in FIGS. 1, 3 and 6.

Such a duct may be connected to a source of warm or cold air and will conduct the same so that successive portions of the air will discharge from the throat 21 between the wall ends 20. In practice the duct may be made up in lengths of four or more feet and arranged in end-to-end relation, as suggested by the abutting seam 22 in FIG. 4.

The lower channel member 13 is preferably formed as an aluminum extrusion. As shown, said member is formed to have a base plate 23 from which upwardly extend outer side walls 24 and parallel intermediate walls 25. Said walls are arranged in pairs to receive the ends 20 of the duct walls, the mentioned discharge throat 21 of the duct extending to the base plate 23 between the intermediate walls 25. As can best be seen in FIGS. 2 and 4, sheared portions 26 of base plate 23 are bent upwardly to leave said base plate with openings 27 that pass air flow from throat 21.

The side walls 24 of the member 13 are extended downwardly as walls 28 and, from their lower edges there are laterally extending flanges 29. The base plate 23 and walls 28 cooperate to form a bottom-open channel 30. Along the outer faces of the wall 28 are provided opposed longitudinal grooves 31 that are receptive of the clips 16 and of splicer bars 32 which connect the ends of abutting members 13 to align said ends and, thereby, form a continuous bottom enclosure for an aligned series of end-abutted ducts 12, such as above described.

Said member 13, in its base plate 23, is provided with a series of slots 33 between the walls 24 and 25 of each pair thereof, the same being transversely aligned with the openings 27, although shorter in longitudinal extent than said openings. Also, threaded holes 34 are formed in the base plate 23 wherever desired between adjacent openings 27.

The duct-supporting means 14 is preferably provided at the abutting seams 22. Said means is shown as a hanger rod 35 that has an eye 36 in the end thereof that extends above the top of the duct 12, and a threaded lower end 37 that is engaged with a hanger clip 38 that extends through one of the openings 27 and has outturned flanges 39, that are engaged with the under face of base plate 23, and upturned ends 40 on the flanges 39 and which extend upwardly through slots 33.

The hanger means is first applied by drawing the clip 38 into position engaged with member 13. This is done by turning the rod 35 from above, although a screw driver slot may be provided in the threaded lower end of the hanger rod so that assembly may be effected from beneath. Then the rods 9 in the slab 7 may be connected to the rod 35 by engaging the same with the eye 36.

A washer plate 41 may be provided at each seam 22 to render alignment of the duct sections easier.

The means 15 (FIGS. 1, 3 and 4) is shown as an elongated baffle wall 42 that is narrower in width than channel 30 and resides in said channel to provide side passages 43 for air that enters the channel from above. Spring clips 44, carried by said wall 42, have resilient engagement with the inner faces of channel walls 28 to hold said wall 42 in a non-wavering, steady position.

In order to obtain the character of air flow desired—laterally, downwardly, or at any inbetween angle—screws 45, connected to said wall 42 and engaged with the threaded holes 34, may be adjusted to raise or lower said baffle wall. Two positions of such adjustment are shown in FIGS. 1 and 3 and others, as desired, may be had. The crowned upper face 46 of baffle wall 42 minimizes turbulences in channel 30, thereby smoothening the flow of air from said channel.

The means 16 is shown as a connecting clip 47 that has a leg 48 that is engaged in the grooves 31, a portion 49 that extends through a slot 50 in the wall 28 of a member 13 that intersects another such member and in which the leg 48 is engaged and a bendable tab 51 on said portion 49 inwardly clinched against the outer face of wall 28.

The intersecting members 13 are first cut to have a miter fit, at 52, of the flanges 29, as shown in FIG. 5. Then, two clips 47, as above described, are used to connect two intersecting members 13.

It will be noted that the flanges 29 constitute portions that effectively frame ceiling panels or whatever material may be used for finishing the ceiling.

The lengths of members 13 may vary relative to the lengths of the ducts 12. Hence the duct seams 22 will be out of register with the seams where the members 13 abut.

As can be seen in FIG. 6, the downwardly facing channel 30 is adapted to receive and hold aligned the longitudinal cap 53 of a partition 54. The latter may be adjusted by means 55, at the bottom, to insure a nicety of fit between the flange walls 56 of cap 53 and flanges 29 of the member 13.

From the foregoing it will be clear that some of the channels 30, of a system of such channels in a ceiling, may be used for air-distribution purposes and others for engaging panel caps. Also, change or conversion from one purpose to the other may be easily effected without the need for re-painting, refinishing, etc.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A ceiling duct structure comprising
a duct of sound-absorbing material and having lower vertically disposed parallel side wall portions defining a lower longitudinal air-passing throat,
a longitudinal member along the bottom of and across said throat, said member being provided with a base plate upon which said lower vertically disposed side-wall portions of said duct are supported, said base plate having a plurality of air-passing openings therein open to said throat, and said base plate being provided adjacent said throat with vertically disposed side walls cooperating with said base plate to form a downwardly-facing channel, said openings in said base plate being spaced inwardly from said side walls, said side walls portions of the duct making sealing engagement with said base plate and said vertically disposed side walls above said base plate, the lower edges of said side walls being provided below said base plate with out-turned flanges for framing ceiling panels,
and
hanger means connected to said base plate extending upwardly through the duct to support said base plate and the duct from above.

2. A ceiling duct structure as defined in claim 1 in which the said base plate is provided with two pairs of upstanding and transversely spaced walls, the vertically disposed sidewall throat defining portions of the duct being fitted in the spaces between the walls of each upstanding pair thereof.

3. A ceiling duct structure as defined in claim 1 in which the hanger means comprises hanger clips connected from beneath to longitudinally spaced portions of said base plate and extending upwardly through said openings in said base plate, and suspension rods connected to said clips and extending vertically through and beyond the upper wall of the duct.

4. A ceiling duct as defined in claim 1 in which a flow-dividing means is disposed within said channel to laterally distribute downwardly exiting air from said channel.

5. A ceiling duct as defined in claim 1 in which a flow-dividing means is disposed within said channel to laterally distribute downwardly exiting air from said channel, said flow-dividing means comprising a longitudinal member spaced from the sides of the channel and supported from said base plate.

6. A ceiling duct as defined in claim 1 in which a flow-dividing means is disposed within said channel to laterally distribute downwardly exiting air from said channel, said flow-dividing means comprising a longitudinal member spaced from the sides of the channel and supported from the said base plate, and means to connect the longitudinal member in adjusted spaced relation to the base plate.

7. In a duct structure, an air passing and sound deadening duct provided with lower vertically disposed parallel throat-defining sidewall portions, a longitudinal inverted channel member disposed entirely beneath said sidewall portions and in supporting engagement with said duct side wall portions, the transverse web of said channel member being provided with a plurality of air-passing openings that receive air from the duct throat and pass the same to the channel member, each of said openings being spaced from said side walls and being provided with a vertically disposed deflector plate arranged transverse to the longitudinal flow of air in said duct.

References Cited in the file of this patent

UNITED STATES PATENTS

| | | |
|---|---|---|
| 2,568,044 | Wallen | Sept. 18, 1951 |
| 2,863,606 | Tatsch | Dec. 9, 1958 |
| 2,902,918 | Swarner | Sept. 8, 1959 |
| 2,933,035 | Phillips | Apr. 19, 1960 |
| 2,937,589 | Rachlin | May 24, 1960 |
| 3,031,944 | Davidson | May 1, 1962 |
| 3,069,991 | Ericson | Dec. 25, 1962 |